US 6,647,428 B1

United States Patent
Bannai et al.

(10) Patent No.: US 6,647,428 B1
(45) Date of Patent: Nov. 11, 2003

(54) ARCHITECTURE FOR TRANSPORT OF MULTIPLE SERVICES IN CONNECTIONLESS PACKET-BASED COMMUNICATION NETWORKS

(75) Inventors: Vinay K. Bannai, Mountain View, CA (US); Charles F. Barry, Campbell, CA (US); Inwhan Choi, Santa Clara, CA (US); Jason C. Fan, Mountain View, CA (US); Robert F. Kalman, Cupertino, CA (US); Richard Lindquist, San Jose, CA (US); Sohail Mallick, Fremont, CA (US); Atul Shinde, Santa Clara, CA (US); Seshadri Srinivasan, Cupertino, CA (US); Robert Stillman, Los Altos, CA (US); Warren Watts, Sunnyvale, CA (US)

(73) Assignee: Luminous Networks, Inc., Cupertino, CA (US)

( * ) Notice: Subject to any disclaimer, the term of this patent is extended or adjusted under 35 U.S.C. 154(b) by 0 days.

(21) Appl. No.: 09/567,555

(22) Filed: May 5, 2000

(51) Int. Cl.[7] ........................ G06F 15/16; G06F 15/173; G06F 11/00; H04L 12/56
(52) U.S. Cl. ........................ 709/245; 709/236; 709/238; 370/253; 370/355; 370/389; 370/390
(58) Field of Search ................................. 709/251, 245, 709/236, 238; 370/403–406, 424, 452, 909, 253, 355, 389, 390

(56) References Cited

U.S. PATENT DOCUMENTS 4,901,312 A * 2/1990 Hui et al. .................... 370/403
5,721,819 A * 2/1998 Galles et al. ................ 709/243

(List continued on next page.)

OTHER PUBLICATIONS

Grover et al., High Availability Path Design in Ring–Based Optical Networks, 1999, IEEE, vol. 7, No. 4, pp. 558–574.*
IE TF draft entitled, "Carrying Label Information in BGP–4", Rekhter, et al., 7 pages (Jan. 2000).
IE TF draft entitled, "LDP Specification", Andersson, et al., 94 pages (Apr. 2000).
IE TF draft entitled "A Framework for Multiprotocol Label Switching", Callon, et al., 63 pages (Sep. 1999).
IE TF draft entitled Transport of Layer 2 Frames Over MPLS, Martini, et al., 8 pages (Dec. 1999).
IE TF draft entitled "MPLS Label Stack Encoding", Rosen, et al., 17 pages (Sep. 1999).
MMC Data Sheet entitled "GMAC–B3 Gigabit Media Access Controller", 50 pages (1999).
MMC Data Sheet entitled "EPIF 4–L3 Reference Manual", 64 pages (Oct. 1998).
PMC Sierra Inc. Data Sheet entitled "PM–4351 Comet Combined E1/T1 Transceiver/Framer", Issue 8, 66 pages (Jul. 1999).

*Primary Examiner*—Krisna Lim
(74) *Attorney, Agent, or Firm*—Sawyer Law Group LLP

(57) ABSTRACT

An architecture for transport of multiple services in connectionless packet-based networks is described herein, along with the packet format used for data transport in this architecture. The architecture supports transport of both connectionless packetized data and framed data from synchronous leased lines. The architecture supports transparent packetization of incoming DS1 data. The architecture works for mesh architectures but is optimized for OSI Layer 1 (crossconnect) and Layer 2 (Virtual LAN, or VLAN) services and for ring topologies, since for these services in a ring no path setup is required using a label distribution protocol. In addition, it simultaneously supports OSI Layer 1, Layer 2, and Layer 3 services.

15 Claims, 11 Drawing Sheets

| Bytes | LumEther Packet Format Definition | |
|---|---|---|
| 1 | Address Mode | Version |
| 1 | Header Checksum | |
| 1 or 6 | Destination Address | |
| 1 or 6 | Source Address | |
| 1 | Type | |
| 1 | Class of Service | |
| 2 | Tag | |
| 1 | Additional Tag | Reserved (Class of Service 3 bits, Stack 1 bit) |
| 1 | Time To Live | |
| 0 to 1600 | Payload | |
| 4 | Payload Frame Check Sequence (optional) | |

| Bytes | Ethernet with MPLS Label Stack Packet Format Definition | |
|---|---|---|
| 6 | Destination Address | |
| 6 | Source Address | |
| 1 | Length/Protocol Type | |
| 1 | Length/Protocol Type | |
| 2 | Tag | |
| 1 | Tag | Reserved (Class of Service 3 bits, Stack 1 bit) |
| 1 | Time To Live | |
| 0 to 1600 | Payload | |
| 4 | Packet Frame Check Sequence | |

U.S. PATENT DOCUMENTS

| | | | | |
|---|---|---|---|---|
| 5,815,516 | A | * 9/1998 | Aaker et al. | 714/807 |
| 5,875,306 | A | * 2/1999 | Bereiter | 709/220 |
| 6,094,525 | A | * 7/2000 | Perlman et al. | 709/245 |
| 6,108,338 | A | * 8/2000 | Ramfelt et al. | 370/403 |
| 6,125,399 | A | * 9/2000 | Hamilton | 709/245 |
| 6,137,797 | A | * 10/2000 | Bass et al. | 370/392 |
| 6,151,324 | A | * 11/2000 | Belser et al. | 370/397 |
| 6,208,651 | B1 | * 3/2001 | Van Renesse et al. | 370/392 |
| 6,212,183 | B1 | * 4/2001 | Wilford | 370/392 |
| 6,212,185 | B1 | * 4/2001 | Steeves et al. | 370/392 |
| 6,230,144 | B1 | * 5/2001 | Kilkki et al. | 705/30 |
| 6,289,369 | B1 | * 9/2001 | Sundaresan | 709/103 |
| 6,301,254 | B1 | * 10/2001 | Chan et al. | 370/397 |
| 6,438,143 | B1 | * 8/2002 | Higashida | 370/503 |
| 6,442,134 | B1 | * 8/2002 | Mitchell | 370/223 |
| 6,449,279 | B1 | * 9/2002 | Belser et al. | 370/397 |
| 6,473,397 | B1 | * 10/2002 | Au | 370/223 |
| 6,512,768 | B1 | * 1/2003 | Thomas | 370/389 |
| 6,519,737 | B1 | * 2/2003 | Derby | 714/781 |
| 2002/0160771 | A1 | * 10/2002 | Massie et al. | 455/426 |

* cited by examiner

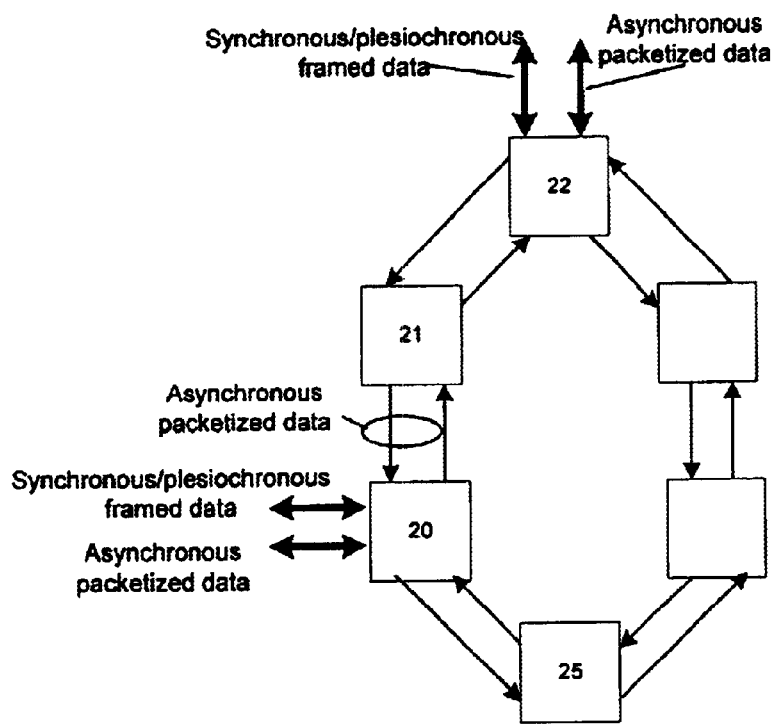
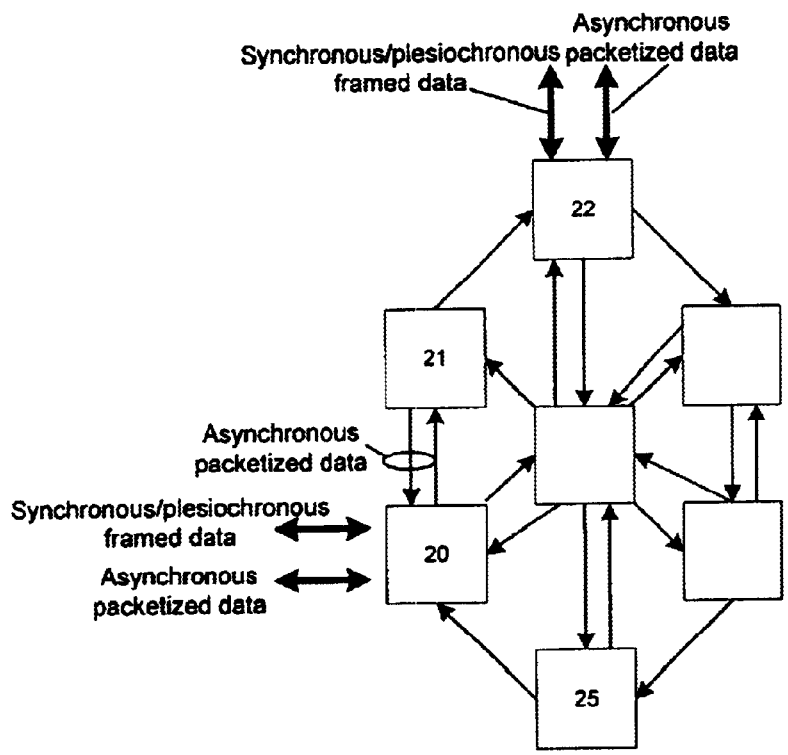
FIG. 2

| Bytes | LumEther Packet Format Definition | |
|---|---|---|
| 1 | Address Mode | Version |
| 1 | Header Checksum | |
| 1 or 6 | Destination Address | |
| 1 or 6 | Source Address | |
| 1 | Type | |
| 1 | Class of Service | |
| 2 | Tag | |
| 1 | Additional Tag | Reserved (Class of Service 3 bits, Stack 1 bit) |
| 1 | Time To Live | |
| 0 to 1600 | Payload | |
| 4 | Payload Frame Check Sequence (optional) | |

| Bytes | Ethernet with MPLS Label Stack Packet Format Definition | |
|---|---|---|
| 6 | Destination Address | |
| 6 | Source Address | |
| 1 | Length/Protocol Type | |
| 1 | Length/Protocol Type | |
| 2 | Tag | |
| 1 | Tag | Reserved (Class of Service 3 bits, Stack 1 bit) |
| 1 | Time To Live | |
| 0 to 1600 | Payload | |
| 4 | Packet Frame Check Sequence | |

FIG. 3

| Bytes | Packet Format Definition at Tributary Interface Card to Switching Card Interface | |
|---|---|---|
| 1 | Ingress Port ID (optional) | |
| 1 | Protection Type | |
| 2 | Stream ID for Switching Card Switch Fabric (optional) | |
| 2 | Stream ID for Tributary Interface Card Switch Fabric (optional) | |
| 1 | Address Mode | Version |
| 1 | Header Checksum | |
| 1 | Destination Address (lookup key) | |
| 1 | Source Address (lookup key) | |
| 1 | Type | |
| 1 | Class of Service | |
| 2 | Tag | |
| 1 | Additional Tag | Reserved |
| 1 | Time To Live | |
| 0 to 1600 | Payload | |
| 4 | Payload Frame Check Sequence (optional) | |

FIG. 5

| Bytes | Packet Format Definition at Switching Card to Tributary Interface Card Interface | |
|---|---|---|
| 1 | Egress Port ID | |
| 2 | Stream ID for Tributary Interface Card Switch Fabric | |
| 1 | Address Mode | Version |
| 1 | Header Checksum | |
| 1 or 6 | Destination Address | |
| 1 or 6 | Source Address | |
| 1 | Type | |
| 1 | Class of Service | |
| 2 | Tag | |
| 1 | Additional Tag | Reserved |
| 1 | Time To Live | |
| 0 to 1600 | Payload | |
| 4 | Payload Frame Check Sequence (optional) | |

FIG. 6

ARCHITECTURE FOR TRANSPORT OF MULTIPLE SERVICES IN CONNECTIONLESS PACKET-BASED COMMUNICATION NETWORKS

FIELD OF THE INVENTION

This invention relates to communication networks and, in particular, to a network architecture and corresponding packet header definition used for end-to-end transport through a connectionless packet-based network of multiple services originating at a variety of different types of tributary interfaces.

BACKGROUND

Metropolitan access networks of the future must be able to carry packetized data traffic in a low-cost and efficient manner while at the same time providing a means for transport of synchronous or plesiochronous leased-line services. These networks must be flexible enough to offer a combination of Open Systems Interconnection (OSI) Layer 1, Layer 2, and Layer 3 services at lower-speed ingress ports at customer premises, and must be able to uplink aggregated data from these lower-speed interfaces to higher-speed uplink ports located at gateways to core transport networks. These networks must provide facility protection by enabling data to be rerouted in the event of failure, either in mesh or bi-directional ring topologies. These networks must offer different service classes based upon the delay, jitter, and reliability requirements of each customer. These networks must also minimize operational cost by simplifying network management, especially provisioning functions.

Traditional connectionless, packetized data networks based on Internet Protocol (IP) routers or Ethernet switches are inherently closer to meeting the above requirements than connection-oriented asynchronous transfer mode (ATM) networks or time-division-multiplexed synchronous optical network (SONET) rings. However, neither type of network is sufficiently flexible to seamlessly transport data of other protocol types, such as synchronous leased lines, or to offer a combination of OSI Layer 1, 2, and 3 services across different ports on a single device. Ethernet as defined in IEEE Standard 802.3-1998 does not have classes of service. Ethernet devices are limited to operation in local area networks (LANs). IP routers do not enable efficient label-based or tag-based lookups at each hop through a network.

Ethernet with a multi-protocol label-switched (MPLS) label stack as defined in the Internet Engineering Task Force (IETF) Internet Draft "MPLS Label Stack Encoding" by E. Rosen et al., draft-ietf-mpls-label-encaps-07.txt, incorporated herein by reference in its entirety, provides 8 classes of service and a 20-bit tag that can be used to switch packets via a label-based lookup at each hop through a network. It also provides an 8-bit time-to-live (TTL) field. Label-switched routers (LSRS) capable of performing a combination of IP routing, MPLS label-based lookups, and policy-based wild-card lookups are able to offer a combination of OSI Layer 1, 2, and 3 services across different ports on a single device. The use of MPLS also enables multiple protocol formats encapsulated within Ethernet frames to be carried as interleaved packetized units within the same data stream.

We have taken note of these ideas and built upon them in our architecture for transport of multiple services in connectionless packet-based networks, and in the formulation of the Optical Packet Transport Network (OPTNet) packet format used for data transport in this architecture. (This name is used to refer to the packet format in this specification purely for convenience and is not necessarily the permanent name associated with this packet format.) Part of the OPTNet packet format resembles the Ethernet with MPLS label stack packet format. Other portions of the OPTNet packet format differ to provide additional or different functionality or improved efficiency. Our architecture supports transport of both connectionless packetized data and framed data from synchronous leased lines. In addition, a fundamental premise of our architecture is simplicity in provisioning and management. Our architecture is optimized for OSI Layer 1 and Layer 2 (Virtual LAN, or VLAN) services and for ring topologies, since for these services in a ring it requires no path setup using a label distribution protocol. It supports OSI Layer 1, Layer 2, and Layer 3 services.

SUMMARY

An architecture for transport of multiple services in connectionless packet-based networks is described herein, along with the packet format used for data transport in this architecture. The architecture supports transport of both connectionless packetized data and framed data from synchronous leased lines. The architecture supports transparent packetization of incoming DS1 data. The architecture works for mesh architectures but is optimized for OSI Layer 1 (crossconnect) and Layer 2 (Virtual LAN, or VLAN) services and for ring topologies, since for these services in a ring no path setup is required using a label distribution protocol. In addition, it simultaneously supports OSI Layer 1, Layer 2, and Layer 3 services.

BRIEF DESCRIPTION OF THE DRAWINGS

FIG. 2 illustrates representative ring and mesh topologies interconnecting nodes belonging to a given virtual network.

FIG. 3 illustrates the OPTNet packet format used on links interconnecting nodes belonging to a OPTNet-enabled virtual network. Shown for reference is the packet format used by Ethernet frames utilizing the MPLS label stack format.

FIG. 5 illustrates the packet format used on the tributary interface card to switching card interface internal to a node of a OPTNet-enabled virtual network.

FIG. 6 illustrates the packet format used on the switching card to tributary interface card interface internal to a node of a OPTNet-enabled virtual network.

DETAILED DESCRIPTION OF THE EMBODIMENTS

The inventions described herein provide an architecture for transport of multiple services in connectionless packet-based communication networks, and the packet formats and manipulations required for the delivery of services in networks based on this architecture. Certain aspects of the preferred embodiment are:

a. The definition of the OPTNet packet format used for all packets transmitted between OPTNet interfaces of connected devices.

b. The internal mechanisms and packet header manipulations internal to a device used to create OPTNet packets from incoming data on non-OPTNet interfaces, and to convert OPTNet packet to outbound data on non-OPTNet interfaces.

c. The combination of destination address comparison and tag lookup performed for incoming packets on OPTNet interfaces.

These aspects are described in detail below, after a description of the networks to which the inventions described herein are applicable.

Description of the Network

Figure 1:
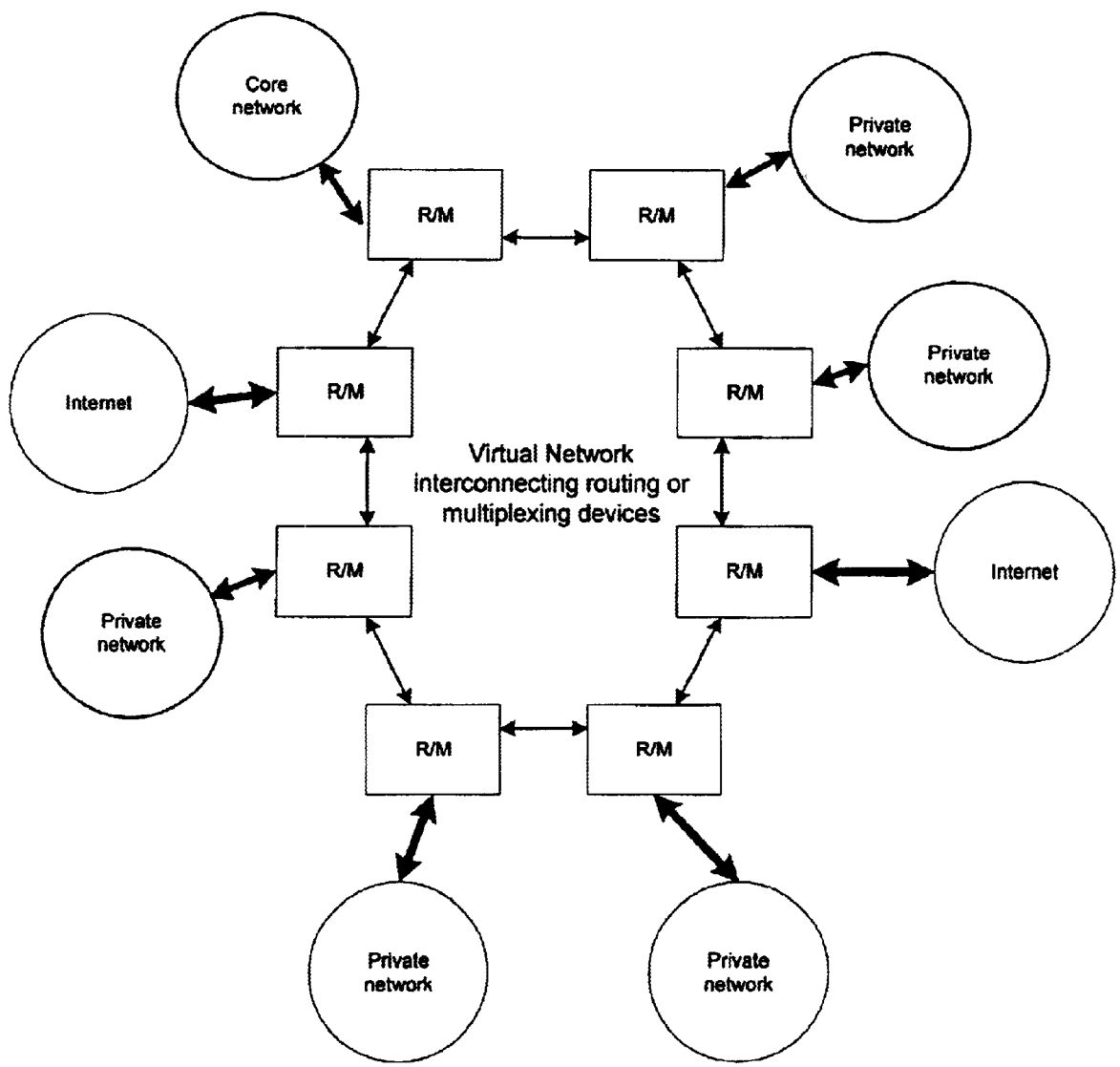
FIG. 1 illustrates multiple, interconnected virtual networks, with certain nodes also connected to the internet.

This invention is applicable to devices in a defined virtual network topology. A device is considered to be part of the virtual network if it has at least one full-duplex interface connecting it to other devices in the virtual network, and if all data traveling over that interface is packetized in a connectionless manner and has a uniform packet format, known as the OPTNet packet format. At least some and usually all of the devices in the virtual network also have full-duplex interfaces connecting them to devices outside the virtual network. The devices within the virtual network are routing and/or multiplexing devices. FIG. 1 shows an example of a virtual network in a ring configuration. The internets, private networks, and core network are not part of the virtual network. Every interface on physical links connecting devices in the virtual network uses the OPTNet packet format, and such links are called OPTNet-compatible links. A common purpose of such virtual networks is to aggregate traffic originating from the external interfaces for delivery to an uplink interface to the core network, and to deliver traffic from the core to the appropriate external interface. Traffic may also be delivered directly between external interfaces without visibility to the uplink interface.

The purpose of the virtual network is to deliver data from a variety of different kinds of external interfaces to corresponding compatible external interfaces elsewhere in the network. The traffic originating at any given device is packetized into OPTNet format and multiplexed. FIG. 2 shows examples of two different virtual network topologies, one with a bi-directional ring topology and the other with a mesh topology. The thick arrows show representative interfaces to the virtual network from outside the virtual network. The interfaces may be of several distinct types, including synchronous framed data interfaces such as DS1, plesiochronous framed data interfaces such as DS3, synchronous data interfaces containing packets such as OC-3 Packet over SONET (PoS), OC-12 PoS, and higher OC rates, asynchronous connectionless packetized data interfaces such as Fast Ethernet (100BaseT) and Gigabit Ethernet, and asynchronous connection-oriented cell-based or frame-based data interfaces such as asynchronous transfer mode (ATM) and frame relay (FR) interfaces. All data delivered from one device to another within the virtual network must be converted to the OPTNet packet format, as on the OPTNet-compatible links interconnecting devices 20 and 21. Upon arrival at the destination device, the packet is then converted back to the required format for the appropriate egress interface to the virtual network.

It is important to note that OPTNet packets corresponding to all types of services and data interfaces share the bandwidth of the OPTNet-compatible links as part of the same serial data stream. There is no need to segregate different types of services and data interfaces to different serial data streams, such as streams on different optical wavelengths.

Description of OPTNet Packet Format

FIG. 3 shows the OPTNet packet format along with the Ethernet with MPLS label stack packet format given in the Internet Engineering Task Force (IETF) Network Working Group's Internet Draft "MPLS Label Stack Encoding" by E. Rosen et al. The Ethernet with MPLS label stack packet format is provided to help illustrate the aspects of the OPTNet packet format that are unique.

The OPTNet address mode field is 4 bits wide. This field is used to indicate what type of addressing is used in the packet format, as described in the co-pending application entitled "Dual-Mode Virtual Network Addressing," by Jason Fan et al., Ser. No. 09/518957, filed Mar. 3, 2000, and incorporated herein by reference in its entirety. In the virtual networks described earlier to which this invention is applicable, there are two distinct settings for this field, one for a "short" addressing mode (in this case, 1 byte) for the source and destination addresses, and the other for a "long" addressing mode (in this case, 6 bytes corresponding to the Ethernet address length) for the source and destination addresses. This field is not used in the Ethernet with MPLS label stack packet format; that format is restricted to use of 6 byte Ethernet addresses.

An original packet generated by a device external to the virtual network contains a conventional header with a source address of 48 bits and a destination address of 48 bits. At the interface between the external network and the virtual network, where the dual addressing conversion occurs, a processor in the interface node looks up, in a look-up table, a short address (e.g., 1 byte) corresponding to the long destination address in the header. A corresponding short address means that the destination device is within the virtual network associated with the interfacing device. The long addresses in the packet header are replaced by the corresponding short addresses, and the address type (long or short) is identified in the header in the address mode field. The packet with the shortened header is then forwarded to the destination node within the virtual address using the short address.

An original packet generated at a node within the virtual network contains the long source and destination addresses. This original packet is typically output from a tributary interface card within a node. A packet processor within the node receives the original packet and, using a lookup table, identifies the corresponding short source address, replaces the long source address in the header with the short address, and identifies the address type in the address mode field. This also may be done with the destination address if appropriate. The packet with the short address in the header is then forwarded around the virtual network to the node that interface with the external network. At this point, the short address must be converted into the long address before transmitting the packet outside of the virtual network. To this end, a packet processor in the interface node looks up the corresponding long address and replaces the header containing the short address with a header containing the long address.

For a packet generated internal to the virtual network destined for a device also within the virtual network, an original packet from a tributary interface card in a node with the virtual network will typically have a header with conventional long source and destination addresses. A packet processor in the node identifies a corresponding short address, if any, in a look-up table for each of the long addresses in the header and replaces the packet header with a header containing the short addresses and the address type in the address mode field. Both the source address and destination address can be reduced in this step. The packet with the shortened header is then forwarded in the virtual network to the destination node identified by the short address.

The OPTNet version field is 4 bits wide. This field indicates the version number of the packet format header. Its use is optional unless there are multiple distinct versions of the OPTNet packet format in a future network. Then this field will be essential to enable interoperability between old devices able to understand only past versions of the header and new devices able to understand both past and current versions of the header. This field is not used in the Ethernet with MPLS label stack packet format, but a comparable field is used by protocols such as IPv4.

The OPTNet header checksum is 8 bits wide. This field protects the entire OPTNet header through and including the time to live (TTL) field. There are a variety of algorithms that can be used to compute the header checksum. It can be an 8-bit cyclic redundancy check (CRC) such as that used in the ATM cell header. Or it can be a true 8-bit checksum such as that used in the IPv4 header. Algorithms that can be used to compute these are given in the book "Asynchronous Transfer Mode: Solution for Broadband ISDN" by Martin de Prycker, second edition, Ellis Horwood, 1993, and the book "Data and Computer Communications" by William Stallings, fourth edition, Macmillan Publishing Company, 1994, both incorporated herein by reference in their entirety. A header checksum is used for one main reason: to decouple the header error detection from the payload error detection. A packet with an errored header must be discarded because it may end up being delivered to the wrong destination. A packet with an errored payload, however, sometimes should be delivered. For some service types, such as synchronous DS1 leased lines, it is desirable to deliver errored frames to the destination because it is preferable to transmit the errored frames on the DS1 rather than losing the frame entirely. In our architecture, therefore, the type of service and interface from which the packet payload originates determines whether the packet will be discarded based on a payload error. This field is not used in the Ethernet with MPLS label stack format.

The destination and source addresses are either 6 bytes each or 1 byte each. These are dual-mode addresses, as referenced in the description of the address mode field above. Each address is used to identify the actual source and destination devices of the packet within the virtual network. These addresses do not change from hop to hop through the virtual network, and thus their usage is analogous to the use of Ethernet addresses in bridged networks. Broadcast is supported by setting the destination address to all 1's. Multicast is supported by using the broadcast destination address plus a special multicast tag so that each device can individually distinguish which ports of that device should receive the multicast packet. The destination and source address fields are used in the Ethernet with MPLS label stack format but are restricted to 6 bytes each. In addition, these addresses are swapped at each hop by MPLS devices such as LSRs.

The type field may optionally be used to indicate the protocol type of the payload, as in the Ethernet with MPLS label stack header. The use of this field is well known and is described in detail in the book "Gigabit Ethernet" by Rich Seifert, first edition, Addison Wesley Longman, Inc., 1998, incorporated herein by reference in its entirety. It is present in the OPTNet header primarily to make the section of the OPTNet header following the header checksum byte-compatible with the Ethernet with MPLS label stack header.

The class of service field is a 1 byte field that is optionally available to provide up to 256 class of service levels (priorities) for OPTNet packets. When packets traverse ("pass") a given device on the virtual network en route to a different device and there are simultaneously packets waiting to be transmitted ("added") onto the same OPTNet-compatible link as the pass traffic is taking, arbitration must take place to determine whether pass traffic or add traffic will take priority, and also which type of service (such as voice or best effort data) will take priority within the pass and add categories. In the event that the 8 classes of service available in the Ethernet with MPLS label stack format are enough for a given virtual network, the preceding 1 byte type field and the 1 byte class of service field can be combined to mirror the 2 byte length/protocol type field in the Ethernet with MPLS label stack format.

The tag field is used for MPLS, just as in the Ethernet with MPLS label stack header. The function of the tag in MPLS is to enable switching of a packet to a given output port or ports of a device. The use of MPLS tags is well-known and is described in the Internet Engineering Task Force (IETF) Internet Draft "A Framework for MPLS" by R. Callon et al., draft-ietf-mpls-framework-05.txt, incorporated herein by reference in its entirety.

The reserved 4 bits are used for class of service (3 bits) and for indication of the bottom of the stack for stacked labels (1 bit), just as in the Ethernet with MPLS label stack header. The 1 bit for indication of the bottom of the stack for stacked labels is not set in the OPTNet header since there is no use of stacked labels in the OPTNet header. The use of these fields is described in more detail in "MPLS Stack Encoding", incorporated earlier in this specification by reference in its entirety.

The time-to-live field is 1 byte and is decremented by one at the entry to a device from a OPTNet-compatible link. It is used primarily to prevent packets traversing the virtual network from living forever because the destination device is down. This field is used as in the Ethernet with MPLS label stack header.

The payload contains the data to be delivered through the virtual network. Depending on whether the data is already protected with a CRC (as would be the case for transport of Ethernet frames through the virtual network as part of a port-to-port crossconnect application), the 4 byte payload frame check sequence is optional. This prevents the use of duplicate CRCs on a OPTNet packet.

Delivery of Packets End-to-End in the Virtual Network

Figure 4:
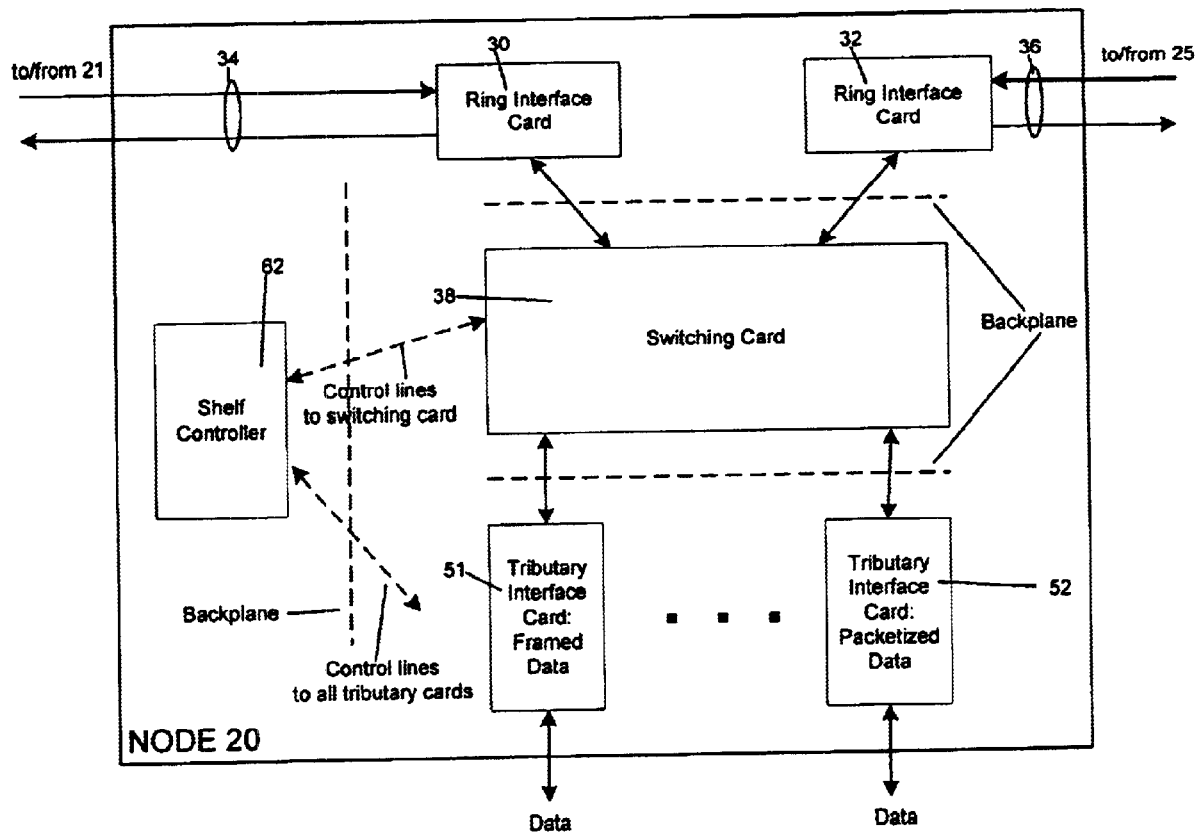
FIG. 4 illustrates pertinent functional units in a node of a OPTNet-enabled virtual network.

FIG. 4 illustrates the pertinent functional units within a single device, such as device 20 within the virtual network of FIG. 2. Each device is connected to adjacent devices by optical interface cards 30 and 32. This particular aspect of FIG. 4 is for a bidirectional ring topology, though there is no inherent limitation to the number of distinct optical interface cards that can be used in a device, and thus no inherent reason that a mesh cannot be supported. These optical interface cards convert the incoming optical signals on fiber optic cables 34 and 36 to electrical digital signals for application to a switching card 38. Each device is also connected to other devices outside the virtual network by tributary interface cards, of which cards 51 and 52 are representative. The incoming signals to the tributary interface cards may be either optical or electrical. If the incoming signal to a tributary interface card is optical, then it converts the incoming signal to an electrical digital signal for application to the switching card 38. The shelf controller 62 performs only control functions and is not on the data path. It is connected to the other cards via backplane lines. The control plane protocol may be 100BaseT switched Ethernet.

Tributary Interface Card to Switching Card Interface

Any tributary interface card is responsible for providing all data to the switching card across the backplane in the form of packets having the packet format defined in FIG. 5. The generation of this packet format may be performed by programmable network processors, field programmable gate arrays (FPGA's), or ASICs. The packet format is very similar to the OPTNet packet format but has important differences.

There are up to four additional fields attached to the front of the packet. The ingress port ID is optionally attached to enable components such as a shaper application-specific integrated circuit (ASIC) to perform operations such as bandwidth policing on an aggregated packet stream from multiple ingress ports. Without the attachment of this ingress port ID, these types of operations could not be performed on the aggregated packet stream. Though this shaping function is performed on the tributary interface card, this field may remain on the packet as it crosses the backplane to the switching card due to the convenience of having a packet processor on the switching card remove the field.

The protection type is attached to tell the switching card whether the packet is to receive path-switched protection, zero-bandwidth protection, or no protection. These protection types are described in detail in the co-pending application entitled "Dynamically Allocated Ring Protection and Restoration Technique," by R.

Kalman et al., Ser. No. 09/519442, filed Mar. 3, 2000, and incorporated herein by reference in its entirety. The protection type is currently defined only for bi-directional ring topologies. Path-switched protection means that the packet is to be sent both directions around the ring. Zero-bandwidth protection means that the packet is to be sent only one direction around the ring, and that this direction may change based on whether there are device failures or fiber breaks on the ring. This direction is to be selected on the ring card. No protection means that the packet is to be sent only one pre-determined direction around the ring and will not be re-routed in the event of device failures or fiber breaks on the ring. An additional setting in the protection type field indicates that the packet is to be routed out a tributary interface card within the same device. When the protection type field is set to this value, there are an additional 4 bytes of stream ID information following it that are not present for any other scenario.

The need for the protection type illustrates an important architectural decision made in the design of this equipment. Provisioning information such as the type of protection given to packets entering from a given port on a tributary interface card is stored on the tributary interface cards by the shelf controller. Information about the virtual network topology and the status of the OPTNet-compatible links making up the topology is determined and stored on the switching card, as described in the co-pending application entitled "Automatic Network Topology Identification by Nodes in the Network," by J. Fan et al., Ser. No. 09/518956, filed Mar. 3, 2000, and incorporated herein by reference in its entirety. The transfer of the protection type information is a single instance where the switching card needs to know provisioning-related information about each packet.

The stream IDs for the switching card switch fabric and the tributary interface card switch fabric are included in the event that the packet is to be routed via the switching card out one of the tributary interface cards of the same device. These two stream ID fields are present only if the protection type field is set appropriately.

Another mechanism is used to simplify operations performed on the switching card. As described in the co-pending application "Automatic Network Topology Identification by Nodes in the Network," incorporated earlier in this specification by reference in its entirety, the switching card has knowledge of the valid 1 byte and 6 byte device addresses that are to be used to deliver packets to their destination devices in the virtual network. The 1 byte addresses can change for any device based on addition or deletion of devices to/from the virtual network, while the 6 byte addresses are permanent. Another architectural decision made in the design of this equipment is to prevent perturbation of provisioning tables on the tributary interface cards due to virtual network topology changes. One way to do this is to use only 6 byte addresses on the tributary interface cards to refer to devices on the virtual network. However, this results in the need for a line-speed packet-by-packet hash lookup on data packets on the switching card when converting from 6 byte addresses to 1 byte addresses. Additional complexity is required to handle hash lookup collisions. We determined that another mechanism would remove the need for this hash lookup. Rather than using 6 byte addresses to refer to devices on the virtual network, the tributary interface cards use permanent 1 byte lookup keys. These 1 byte lookup keys are consistent in meaning across all tributary interface cards in a given device, but need not be consistent between devices since they have only local meaning. These 1 byte lookup keys may be assigned by the switching card or the shelf controller, since both have knowledge of the 6 byte addresses of all devices in the virtual topology. (The correspondence between the lookup keys and the actual addresses must also be known on both the switching card and the shelf controller.) These 1 byte lookup keys must be permanent and are therefore distinct from the 1 byte addresses, e.g. once a 1 byte lookup key is assigned to a device, it is only freed up for use by another device if the original device has been permanently removed from the virtual network. Since the 1 byte lookup key is permanent and known, all lookups on the switching card can be organized so that the lookup key directly accesses a location in memory or a hardware register that contains all relevant 6 byte and 1 byte address information for the device. This is why FIG. 5 shows that the destination address and source address fields of packets crossing from a tributary interface card to a switching card contain 1 byte lookup keys rather than actual device addresses.

Switching Card to Tributary Interface Card Interface

The switching card is responsible for providing all data to any tributary interface card across the backplane in the form of packets having the packet format defined in FIG. 6. The generation of this packet format may be performed by programmable network processors, field programmable gate arrays (FPGA's), or ASICs. The packet format is very similar to the OPTNet packet format but has important differences.

There are two additional fields attached to the front of the packet. The egress port ID is attached to enable tributary interface cards that do not contain a switch fabric to easily determine which output port on which to send the data within the packet. The port ID may represent not only a distinct physical port, but also a distinct slot within a physical port, e.g. a distinct DS1 slot within a DS3 output port. It can also be optionally used to enable components such as a shaper application-specific integrated circuit (ASIC) on the tributary interface card to perform operations such as rate shaping on egress ports on an aggregated packet stream originating from the switching card. Without the attachment of this egress port ID, these types of operations could not be performed on the aggregated packet stream. The stream ID for the tributary interface card switch fabric is required for tributary interface cards that do contain a switch fabric. This stream ID is directly used to route the relevant packet through the switch fabric to the desired tributary output port(s).

The actual perturbations of the values in the header fields as packets travel through the network as well as the different sets of values used for different interface and/or service types are described in the sections below.

Detailed Description of Tributary Interface Card for Packetized Data

Figure 7:
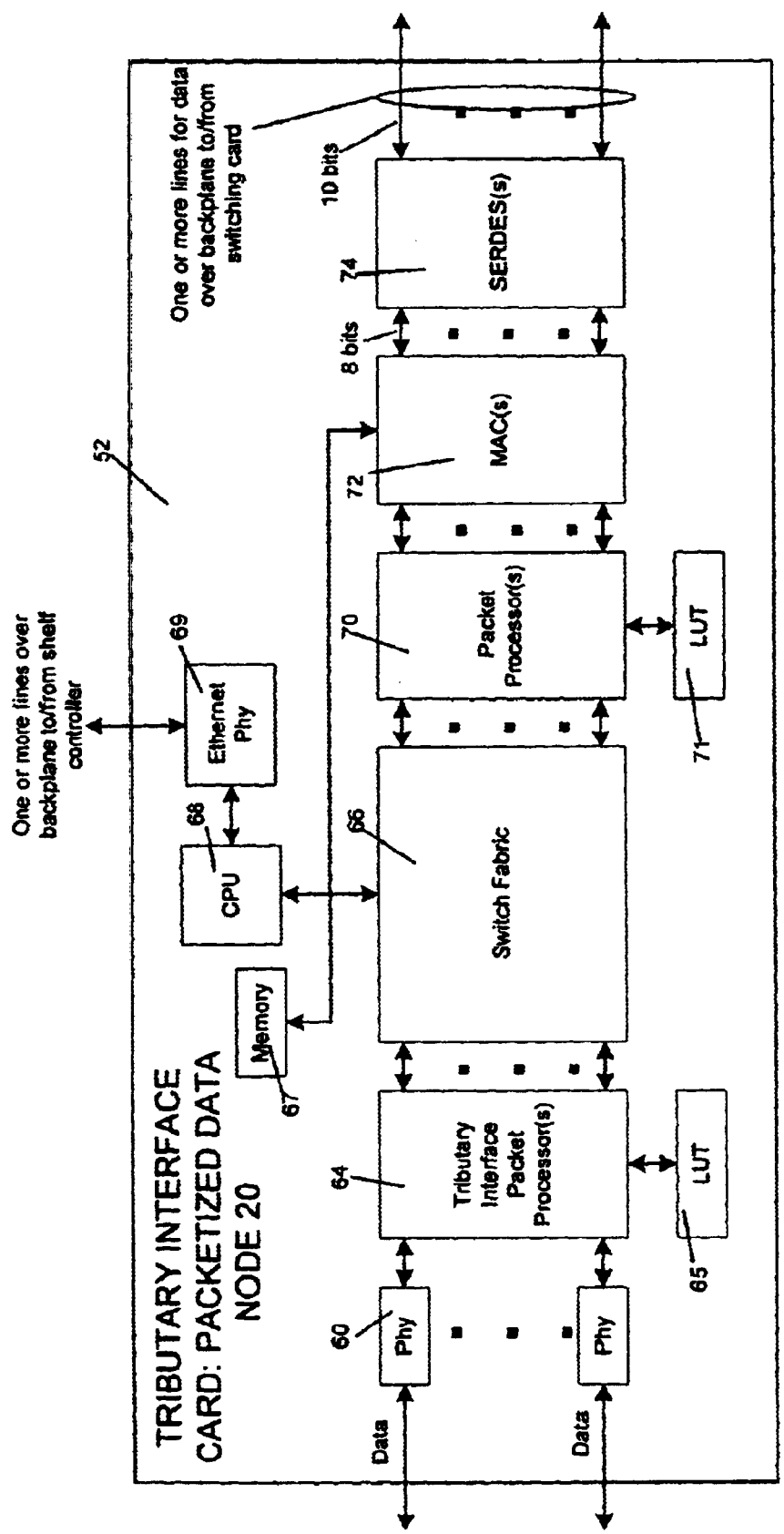
FIG. 7 illustrates additional detail of the tributary interface card for packetized data in FIG. 4.

FIG. 7 illustrates one tributary interface card for packetized data 52 in more detail, showing the path taken from ingress data ports interfacing to devices outside the virtual network to the backplane interface between the tributary interface card and the switching card. There may be two sets of backplane interfaces to enable communication with a pair of redundant switching cards for added reliability.

This embodiment of the tributary interface card has multiple 10BaseT or 100BaseT Ethernet interfaces to devices outside the virtual network. Ethernet is a well-known connectionless Layer 2 protocol and is defined in the IEEE 802.3-1998 standard, incorporated herein by reference in its entirety. For clarification, the use of the term "Ethernet frame" is a standard term for a variable-length data unit, e.g. an Ethernet "packet", on an asynchronous, connectionless Ethernet interface and should not be confused with the term "synchronous frame" used elsewhere in the document for fixed-length blocks of data in synchronous interfaces such as DS1. The Ethernet physical layer interface functions are handled by an Ethernet Phy device 60. An example of a suitable Ethernet Phy device is the Broadcom BCM5218, whose data sheet is incorporated herein by reference.

A packet processor or multiple packet processors 64 associates each of the bits transmitted by the Phy/Mac device 60 with a field in the Ethernet frame format given in the IEEE 802.3 standard. The packet processor 64 detects the header fields of the packet, performs a lookup based on port provisioning information and/or a subset of fields in the packet, and attaches the header described in FIG. 5 to the front of the packet before sending it on to the switch fabric 66. The per-packet operations performed by the packet processor 64 are user-defined in processor microcode. This enables data on each port to be processed in a manner independent of the data on other ports.

There are several different types of packet classification that can be supported at each 10/100 BaseT port. A port may transparently forward its data based on pre-configured provisioning information to another port or ports. This may occur directly to another port on the same card (known as a type I crossconnect), another port on a different tributary interface card within the same device (known as a type II crossconnect), or to another port on a tributary interface card within a different device on the virtual network (known as a type III crossconnect). A port may perform a packet-by-packet lookup based on an Ethernet VLAN ID, described in the book "Interconnections Second Edition" by Radia Perlman, Addison Wesley Longman, Inc., 2000, incorporated herein by reference in its entirety. Again based on pre-configured provisioning information, a port may transparently forward data with a given VLAN ID to another port or ports within the same device or in a different device on the virtual network. A port may also perform a packet-by-packet lookup based on an MPLS tag within the packet, or on an IP address if an IP packet is encapsulated within the Ethernet frame. Examples of suitable packet processors 64 include the EPIF 4-L3C1 Ethernet Port L3 Processor by MMC Networks, whose data sheets are incorporated herein by reference.

The packet processor 64 contains its own internal search machine and interfaces with an external memory 65 (a look-up table) that contains routing information to route the data to its intended destination and other information required to fill the fields in the packet header. Alternatively, the packet processor may interface with an external search machine. The look-up table is filled based a combination of provisioning from an external management system and a tag generation/distribution protocol. The mechanisms used to fill this particular table are described in the section "Mechanisms to Provide Provisioning and Routing information to Tributary Interface Cards."

The header added to the front of the packet by the packet processor 64 contains the following values for the different service types above. The header is added to the front of the packet for all packets that are determined to leave the tributary interface card based on a look-up (described below). The below settings for the header fields are only representative of a few of the many possible settings that can be used:

Ingress port ID: 1 to N, where N is the total number of physical ports on the tributary interface card.

Protection type: 0 for zero-bandwidth protection, 1 for path-switched protection, 2 for no protection, 3 for additional stream ID fields immediately following the protection type field. 0 is not supported on this tributary interface card.

Stream ID for switching card switch fabric: This contains the stream ID for the packet to use when passing through the switching card switch fabric on the way out one of the tributary interface cards of the same device. This field is inserted only for packets that will travel from one tributary interface card to a different tributary interface card within the same device.

Stream ID for tributary interface card switch fabric: This contains the stream ID for the packet to use when passing out the egress tributary interface card of the same device. This field is inserted only for packets that will travel from one tributary interface card to a different tributary interface card within the same device.

Address mode: 0 for 1 byte addressing mode, 1 for 6 byte addressing mode.

Version: 0 for current version.

Header checksum: 8-bit one's complement addition of all 8 bit words in the header (excluding the checksum byte itself).

Destination lookup key: Destination device in virtual network. Type of lookup used to determine this is based on packet classification type. Destination lookup key for each destination assigned to tributary interface card by shelf controller. A destination lookup key of all 1's is reserved for broadcast messages.

Source lookup key: Value assigned to tributary interface card by shelf controller.

Type: Set to 0 for standard tag. It may be used for encapsulated protocol types other than IP (SNA, IPX, DECnet, etc.) or for other future needs.

Class of Service: May be set to 0 for control traffic, 1 for toll-quality voice traffic, 2 for video traffic, 3 for best effort provisioned traffic, and 4 for best effort unprovisioned traffic. Or may be set based on 0 for expedited forwarding (EF) traffic, 1 for assured forwarding (AF) traffic, and 2 for best-effort (BE) traffic. These classes are defined in the Internet Engineering Task Force (IETF) RFC 2598 "An Expedited Forwarding Per-Hop Forwarding Behavior" by V. Jacobson et al., and by RFC 2597 "Assured Forwarding Per-Hop Forwarding Behavior Group" by J. Heinanen et al., both incorporated herein by reference in their entirety. The class of service value may be provisioned on a port basis or may be mapped from the contents of header fields in the incoming packet (such as the type of service field in the IP header).

Tag: Filled in based on the value found by a tag lookup.

Reserved: The most significant three bits mirror the class of service value set in the above class of service field. The least significant bit is set to zero (not used).

Time to live: Set to 255 (maximum possible value). The TTL should only reach 0 in the event of a malfunctioning device or devices. For non-broadcast packets, the destination will pull the packet off the network in normal operation. For broadcast packets, the source will pull the packet off the network if it is a bi-directional ring. In a mesh network, each device must ensure that it does not forward a broadcast packet received from a given interface more than once, as in the Open Shortest Path First (OSPF) link state protocol. This is described in "Interconnections Second Edition" by Radia Perlman, incorporated earlier in this specification by reference in its entirety.

Payload frame check sequence: Whether a payload FCS (CRC) is added at the end of the packet may optionally be determined at the MAC 72. Otherwise it is always added at the MAC 72.

If the port is configured to behave as a transparent crossconnect or Ethernet VLAN port, then the packet processor 64 directly attaches the above header to the front of the incoming Ethernet frame. The tag is determined by a table lookup based on provisioned information (such as port ID for a crossconnect) or based on the Ethernet VLAN identifier. The tag is determined in a similar manner for a pre-configured multicast.

Optionally, if the port is configured to behave as a transparent Ethernet stack encoding port, then the packet processor 64 directly attaches the above header to the front of the incoming Ethernet frame. The tag is determined by a table lookup based on provisioned information (a specific MPLS label in the stack). This type of service is described in the Internet Engineering Task Force (IETF) Internet Draft "Transport of Layer 2 Frames over MPLS" by L. Martini et al., draft-martini-l2circuit-trans-mpls-00.txt, incorporated herein by reference in its entirety.

Optionally, if the port is configured to behave as a normal Ethernet stack encoding port, the packet processor 64 acts in an identical fashion.

Optionally, if the port is configured to behave as an IP router port, then the packet processor 64 removes the Ethernet header from the encapsulated IP packet and attaches the above header to the front of the IP packet. The tag is determined by a standard, well-known IP routing lookup mechanism such as a Patricia tree or a ternary content addressable memory (TCAM) lookup based on an appropriate subset of fields in the IP header.

The packet processor 64 provides the packet to a port of the switch fabric 66, which then routes the packet to the appropriate port of the switch fabric 66 based on a stream ID passed to the switch fabric via a control line. The stream ID is dependent on both the lookup and the class of service for the given packet. If the packet is a data packet, the switch fabric routes the packet to the packet processor 70. Depending on the class of service of the packet, the packet is routed through the switch in a prioritized manner using quality-of-service aware queueing mechanisms within the switch. If the packet is a control packet, such as an incoming routing or label distribution packet, then the switch fabric routes the packet to the CPU 68. The CPU may be a Motorola MPC860DT microprocessor.

One suitable packet switch is the MMC Networks model nP5400 Packet Switch Module, whose data sheet is incorporated herein by reference. The switch provides packet buffering, multicast and broadcast capability, four classes of service priority, and scheduling based on strict priority or weighted fair queueing.

A memory 67 in FIG. 7 represents memories in the node other than that used for the lookup tables, although it should be understood that there may be distributed SSRAM, SDRAM, flash memory, and EEPROM to provide the necessary speed and functional requirements of the system.

The CPU 68 is connected to a quad Ethernet Phy device 69 such as the AM79C875KC by Advanced Micro Devices or any other suitable type. This device connects the tributary interface card to a management network backplane interface, or optionally more than one for purposes of redundancy. The CPU is also connected to the switch fabric 66 and the media access controller (MAC) 72. Via its connection to the switch fabric, the CPU is able to access the values in the lookup tables as described in the MMC documentation referenced earlier in this specification.

The packet processor 70 and lookup table 71 are optional for some switching fabric implementations. They are necessary for the MMC switching fabric since a packet processor is required at every switching fabric output interface. An example of a suitable packet processor 70 includes the XPIF 300 Gigabit Bitstream Processor by MMC Networks, whose data sheets are incorporated herein by reference.

A media access controller (MAC) 72 converts from the parallel 32-bit Generic Gigabit Interface (GGI) at the output of the packet processor 70 to the parallel 8-bit interface required at the input to the serializer/deserializer (SERDES) 74. MACs are well known and are described in the book "Telecommunication System Engineering" by Roger Freeman, third edition, John Wiley & Sons, Inc., 1996, incorporated herein by reference in its entirety. One function that may be optionally performed by the MAC is to insert a CRC at the end of an incoming packet as a function of the ingress port identifier at the start of the packet. This determination can be performed based on a header lookup at the packet processor 70. Based on provisioning, the CPU may set the appropriate packet processor registers with the port identifiers of those ingress ports of the card that require a CRC to be inserted. For example, Ethernet frames that are passed intact do not require an additional CRC to be inserted by the MAC. IP packets generated by ports configured to act as IP routing ports (and thus that strip off the Ethernet sections of the packet) do not have a CRC and thus need a CRC to be inserted. The attachment of a CRC is a standard MAC function. The enabling of this to be configurable on a port basis is a feature enabled by the GMAC-B3 Gigabit Media Access Controller by MMC Networks, whose data sheets are incorporated herein by reference.

The parallel output of the MAC 72 is converted into a serial stream of bits by a serializer/deserializer (SERDES) 74. The SERDES 74, in one example, converts a parallel group of 8 bits from the MAC 72 to a serial stream of 10 bits using a table, and vice versa. The 10 bit codes selected to correspond to 8 bit codes meet balancing criteria on the number of 1's and 0's per code and the maximum number of consecutive 1's and 0's for improved performance. For example, a large number of sequential logical 1's creates baseline wander, a shift in the long-term average voltage level used by the receiver as a threshold to differentiate between 0's and 0's. By utilizing a 10-bit word with a balanced number of 1's and 0's on the backplane, the baseline wander is greatly reduced, thus enabling better AC coupling of the cards to the backplane. The SERDES 74 may be a model VSC 7216 by Vitesse or any other suitable type.

On the reverse path through the tributary interface card, the only difference from the above description is that the packet format of FIG. 6 enters the card on the SERDES end. The stream ID for the tributary interface card switch fabric is passed by packet processor 70 to the switching fabric to enable the packet to be routed to the correct output port of the card. The complete header is stripped from the packet by the packet processor 70. The CRC is left on the packet. The data payload of the packet is already in Ethernet format based on operations that occur on the switching card, described below.

Packet processor 64 does not perform any function on egress other than the checking of the CRC on outgoing Ethernet frames and optionally the insertion of a source MAC address in the Ethernet header.

Figure 8:
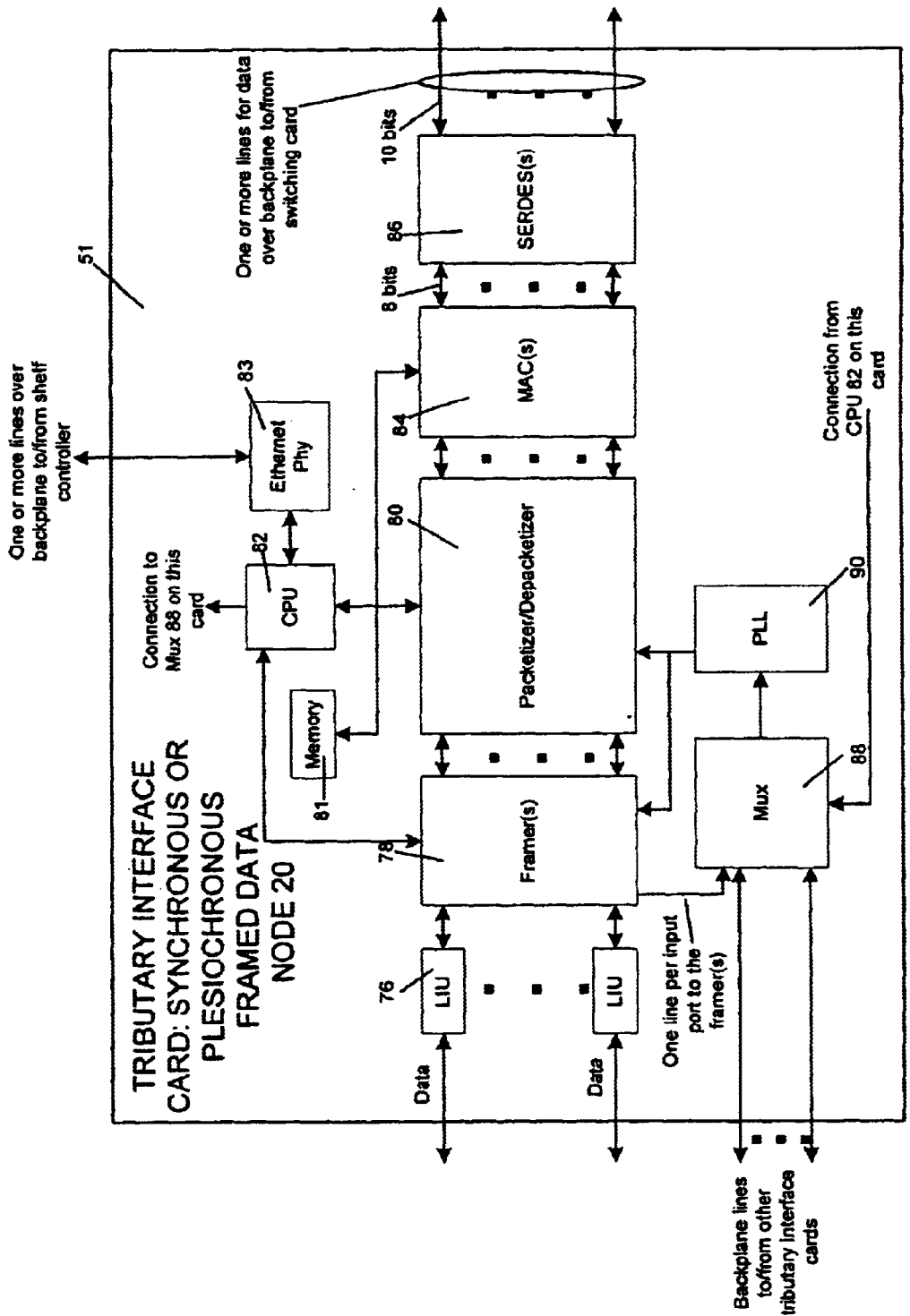
FIG. 8 illustrates additional detail of the tributary interface card for synchronous/plesiochronous framed data shown in FIG. 4.

Detailed Description of Tributary Interface Card for Synchronous/Plesiochronous Framed Data FIG. 8 illustrates one tributary interface card for synchronous or plesiochronous framed data 51 in more detail, showing the path taken from ingress data ports interfacing to devices outside the virtual network to the backplane interface between the tributary interface card and the switching card. There may be two sets of backplane interfaces to enable communication with a pair of redundant switching cards for added reliability.

This embodiment of the tributary interface card has multiple DS1 interfaces to devices outside the virtual network. DS1 is a well-known synchronous framed interface and is defined in the Telcordia GR-499-CORE specification, incorporated herein by reference in its entirety. The physical interface is handled by a DS1 Phy device 76, known as a line interface unit (LIU). After the LIUs, the DS1 data enters the framers 78. The function of the framers is to recover frames from input DS1 streams in the ingress direction, or vice versa in the egress direction. The combination of the LIU and framer functions are handled by a transformer, a well-known component, and a framer. The transformer may be a Pulse PE68624 surface mount common mode choke or another comparable component. An example of a suitable framer is a PMC-Sierra 4351 COMET T1/E1 transceiver, whose data sheets are incorporated herein by reference.

Following the framer is a packetizer/depacketizer 80. The function of this device is to packetize/depacketize groups of DS1 frames in a fully transparent fashion, e.g. without impacting the bits internal to the DS1 frames in any way. The number of successive DS1 frames from a given port combined per packet is configurable by the CPU 82 and is normally set to 4 frames to trade off between data throughput efficiency (which favors long packets) and reduction in end-to-end delay (which favors short packets to minimize packetization delay). This method of packetizing groups of DS1 frames in a transparent fashion is a key decision made in the formulation of this architecture. This is a much simpler model for DS1 transport than systems that process individual DS0s within the DS1. The transparent transport of DS1s makes the virtual network appear as a wire with a constant latency for any given DS1 crossconnect. To ensure that there are no frame slips, it is necessary to buffer enough DS1 frames for each output DS1 port at the egress to the virtual network to compensate for the worst-case jitter through the network. The amount of buffering required is straightforward to estimate either through network simulation or through analytical estimation.

Figure 9:
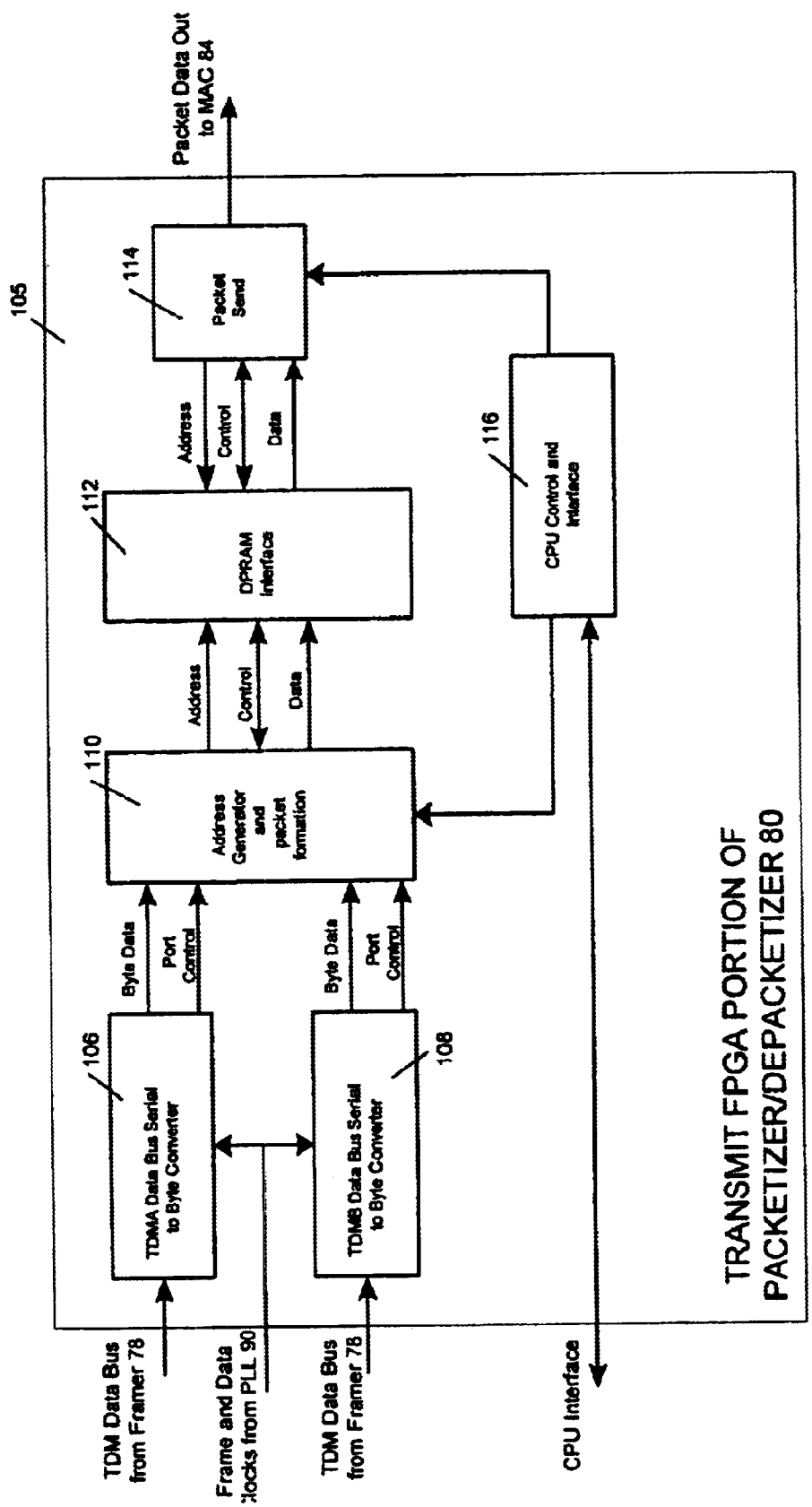
FIG. 9 illustrates additional detail of the transmit FPGA portion of the packetizer/depacketizer shown in FIG. 8.
Figure 10:
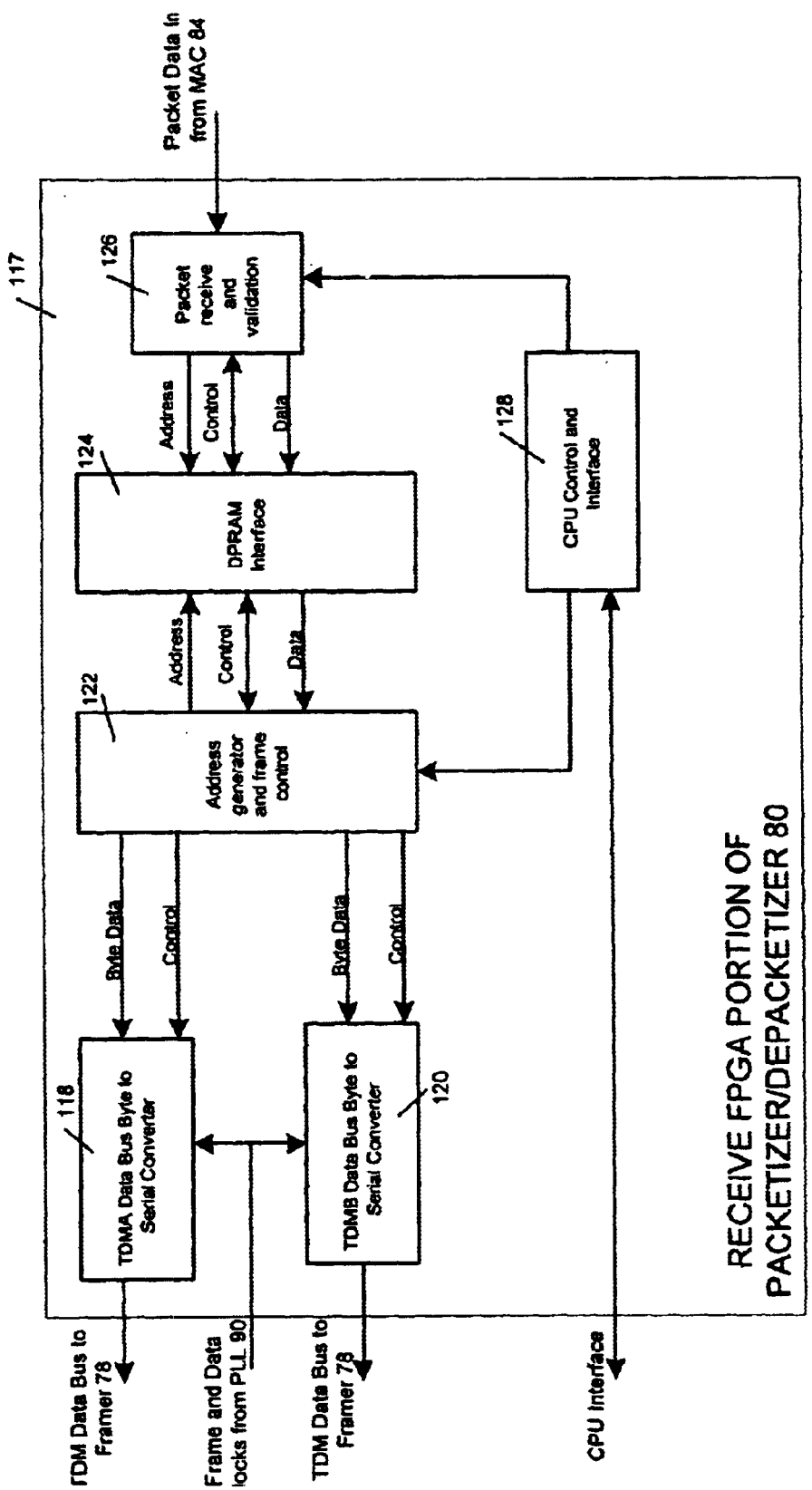
FIG. 10 illustrates additional detail of the receive FPGA portion of the packetizer/depacketizer shown in FIG. 8.

The packetizer/depacketizer may be implemented as an FPGA or as an ASIC. The preferred embodiment is divided into two parts, a transmit FPGA and a receive FPGA. The transmit FPGA 105 is shown in FIG. 9 and the receive FPGA 117 are shown in FIG. 10. The transmit FPGA is connected to a block of dual-port RAM (DPRAM) 112 that enables simultaneous reads and writes to the memory. The receive FPGA is connected to a block of dual-port RAM 124.

The input to the transmit FPGA is over a time division multiplexed (TDM) data bus from the framer 78. For an 8-port DS1 card using an octal framer, there are two TDM buses, A and B, with four framers on each bus. The data from the four DS1 ports handled by each TDM bus is interleaved on a byte basis. The serial rate of the TDM bus is 8.192 Mbps, which is more than adequate to transport 4 interleaved 1.544 Mbps DS1 streams. The incoming data on each TDM bus enters a data bus serial to byte converter (106 and 108), which converts the serial data into an 8-bit parallel data. The 8 kHz frame pulse and the 8.192 MHz data clocking used to do this is obtained from PLL 90, described later in this section. The incoming port of each byte of data that is transferred is indicated on the port control output of each data bus serial to byte converter. The output of both data bus serial to byte converters is passed to an address generator and packet former 110. This module determines on a byte-by-byte basis where to store arriving data in DPRAM. Each byte is stored in a buffer based on the input DS1 port from which the data originated. There are 16 distinct buffer areas in DPRAM, divided into two double-buffered groups of 8. Each buffer area is organized as a FIFO. The module 110 fills one group of 8 buffers, and tracks how full the buffers are. When the buffers are filled with the desired number of DS1 frames used to fill a packet, the module 110 attaches a packet header. A packet sequence number is inserted between the packet header and the payload. It then begins to fill the other set of 8 buffers. The set of 8 buffers that are filled with packets are sent to the MAC 86. The output rate of the MAC 86 is 1 Gbps for this embodiment. The CPU and control interface module 116 provides the values for the fields in the packet header to the address generator and packet former, and controls the packet send module so packets are only sent to the MAC for ports that have provisioned crossconnects. The CPU also monitors errors that may occur on the card.

It is assumed that there are no DS1 crossconnects that connect two DS1 ports within the same physical device. The packet header is a simplified version of that described for the tributary interface card for packetized data:

Ingress port ID: 1 to N, where N is the total number of physical ports on the tributary interface card.

Protection type: 0 for zero-bandwidth protection, 1 for path-switched protection, 2 for no protection.

Stream ID for switching card switch fabric: Never present.

Stream ID for tributary interface card switch fabric: Never present.

Address mode: 0 for 1 byte addressing mode, 1 for 6 byte addressing mode.

Version: 0 for current version.

Header checksum: 8-bit one's complement addition of all 8 bit words in the header (excluding the checksum byte itself).

Destination lookup key: Destination device in virtual network. Destination lookup key for each destination assigned to tributary interface card by shelf controller. Multicast is not supported in the fashion as for packetized data interfaces.

Source lookup key: Value assigned to tributary interface card by shelf controller.

Type: Set to 0 for standard tag.

Class of Service: May be set to 1 for toll-quality voice traffic. Or may be set based on 0 for expedited forwarding (EF) traffic. (DS1 ports specifically get these classes of service because they are synchronous/plesiochronous framed interfaces.)

Tag: Filled in based on the value found by a tag lookup.

Reserved: The most significant three bits mirror the class of service value set in the above class of service field. The least significant bit is set to zero (not used).

Time to live: Set to 255 (maximum possible value).

Payload frame check sequence: A payload FCS (CRC) is always added at the MAC 72.

A DS1 port is always configured to behave as a transparent crossconnect. As described above, module 110 of the transmit FPGA directly attaches the above header to the front of a group of four DS1 frames from a given input port. The tag is determined by a table lookup based on provisioned information (such as port ID for a crossconnect).

The receive FPGA 117 takes incoming data from the MAC 84 and determines from the packet header whether to accept or reject the data. If the receive FPGA is provisioned to accept the incoming packet directed to an output DS1 port on the card, then the packet sequence number is checked against that port's sequence number to determine how to store the packet payload into DPRAM 124. If the port number in the packet header specifies a port that is not enabled for reception, then the incoming packet data is discarded. The DPRAM is broken into two double-buffered sets of 8 areas, as for the transmit FPGA. Each buffer must be a filled to a certain level before data can be taken from the buffer and placed on the TDM bus 118 or 120. This level is dependent on the maximum jitter experienced by a packet traversing the virtual network and is needed to prevent data under-run for each DS1 port.

The above FPGA modules have been broken down into functional blocks simple enough for one of ordinary skill in the art to fabricate the FPGA since the programmable logic required to implement is block is well-known.

The description for components 81, 83, 84 and 86 on this card are identical to the components with the same names on the tributary interface card for packetized data.

The CPU 82 is connected to a quad Ethernet Phy device 83. This device connects the tributary interface card to a management network backplane interface, or optionally more than one for purposes of redundancy. The CPU is also connected to the framer 78, the packetizer/depacketizer 80, and the MAC 84. Via its connection to the packetizer/depacketizer, the CPU is able to set the values in the headers used to encapsulate the DS1 frames.

The DS1, as a synchronous interface, must have an 8 kHz clock source available for distribution to the framer and to the packetizer/depacketizer. This clock source may be provided via an external Building Integrated Timing Source (BITS) clock connected to the device, or via an internal timing source located within the device that can distribute timing over the backplane. Both external BITS clocks and internal timing sources are well-known. These types of timing sources are described in the book "SONET" by Walter Goralski, McGraw-Hill, 1997, incorporated herein by reference in its entirety. For this embodiment, the timing source is obtained from an external BITS clock connected to a DS1 data port. A multiplexer 88 on the DS1 card is configurable by the CPU to accept clocking from a DS1 input port on the same card or from a backplane line from any of the other tributary DS1 cards. There is a separate line for each DS1 input port from the framer 78 to the multiplexer 88. The multiplexer also enables the distribution of this timing source onto the backplane so it is available to all other tributary interface cards. The output of the multiplexer enters a Mitel 9041 AP Output Trunk Phase-Locked Loop (PLL). The PLL accepts an 8 kHz clocking input and generates an 8 kHz output, a 1.544 MHz, and an 8.192 MHz output for T1 clocking to the framers and to the packetizer/depacketizer.

A DS3 card channelized into 28 DS1s would have the same overall architecture as in FIG. 8, with the exception of requiring a DS3 framer and interface module preceding a quad PMC-Sierra 4351 COMET T1/E1 transceiver and the equivalent of a quad packetizer/depacketizer that feeds the combined DS3 data into a single MAC. Examples of components that may be used as the DS3 framer and interface module are the PMC PM7346 SJUNI-QJET DS3 framer and the PM7344 S/UNI-MPH Utopia bus interface module for the DS3 framer. On the egress direction, the depacketizer uses the egress port ID to determine both the egress port and the egress DS1 slot. In the event that the card contains more ports than can be supported in a 1 byte port ID (with 28 entries per port), the port ID must be expanded to at least 2 bytes.

Detailed Description of Switching Card

Incoming packets to the switching card from the backplane interface to the tributary interface cards pass through a SERDES 58 and a MAC 56 that correspond to earlier descriptions of those components. An example of a suitable packet processor 54 is the XPIF-300 Gigabit Bitstream Processor by MMC Networks, described earlier in this specification. The packet processor 54 determines the stream ID that it will use to route each incoming packet through the switching fabric based on the protection type, the class of service, and the stream ID for switching card switch fabric (if present) in the packet format of FIG. 5. If the protection type is set to 3, then the stream ID for the switching card switch fabric is passed directly to the switching fabric via a control line and the other fields are ignored. If the protection type is a different value, then the protection type field is examined and the value of that field determines whether the packet is sent in both directions around the ring or in only one direction. Depending on if the protection type field indicates zero-bandwidth protection or no protection, a preferred direction for zero-bandwidth protection or for no protection is obtained based on the destination lookup key. The mechanisms used to set the preferred direction are described in the co-pending application "Dynamically Allocated Ring Protection and Restoration Technique," incorporated earlier in this specification by reference in its entirety. Also, depending on if the address mode field indicates 1 byte or 6 byte addressing, the appropriate addresses are placed in the packet as described in the co-pending application "Dual-Mode Virtual Network Addressing," incorporated earlier in this specification by reference in its entirety. Packets leaving the packet processor 54 have their fields containing ingress port ID, protection type, and stream ID for the switching card switch fabric stripped if the protection type is not equal to 3. If the protection type is equal to 3, then only the fields containing protection type and stream ID for the switching card switch fabric are stripped.

The output of packet processor 54 enters the switch fabric 50. One suitable packet switch is the MMC Networks model nP5400 Packet Switch Module described earlier in this specification. In one embodiment, four such switches are connected in each switching card for faster throughput. This embodiment is used on the switching card.

Figure 11:
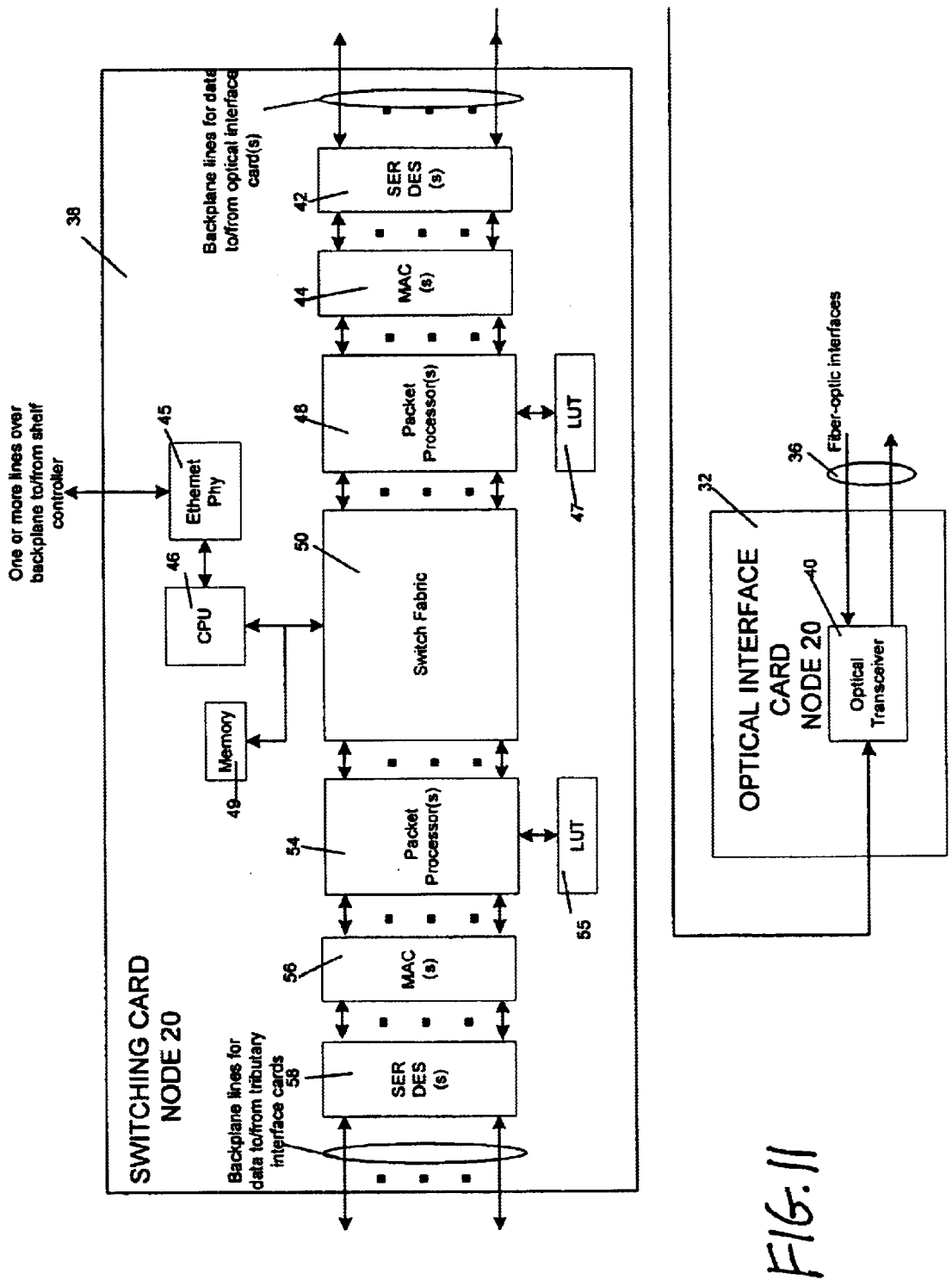
FIG. 11 illustrates additional detail of the switching card and the optical interface card shown in FIG. 4.

The CPU 46, the Ethernet Phy 45, the packet processor 48, the lookup table 47, the memory 49, the MAC 44, and the SERDES 42 correspond to earlier descriptions of these components on the tributary interface card for packetized data. In the case of the switching card, the CPU does have connections to both the MAC devices 44 and 56. The SERDES 42 interfaces across the backplane with the optical interface card 32. FIG. 11 illustrates one optical interface card 32 in more detail showing the optical transceiver 40. An additional switch in card 32 may be used to switch between two switching cards for added reliability. The optical transceiver may be a Gigabit Ethernet optical transceiver using a 1300 nm laser, commercially available.

The packet processor 48 does not change incoming packets from the switch fabric 50. It sends those packets directly to MAC 44. The packets then go through SERDES 42, through the optical interface card 32, and out onto the virtual network. However, packet processor 48 does play a critical role for incoming packets from the optical interface card 32. All packets entering a optical interface card are in OPTNet format. It is necessary to determine if these packets are destined for the device 20 ("drop" traffic) or if they are to be passed on to other devices ("pass" traffic).

The first step is to decrement the TTL field. If the TTL value before decrementing is greater than 0, then it must be decreased by 1. If it is 0, then the packet is immediately dropped. The second step is to determine whether a packet is destined for the device itself. To determine this, the destination address in the OPTNet header is compared to the address of the device itself. The destination address may be in either 1 byte form or 6 byte form, as indicated by the address mode field. The CPU 46 must keep the packet processor 48 updated as to the 1 byte address of the device (the 6 byte address is permanent and is set upon device power-up), as described in the co-pending application "Dual-Mode Virtual Network Addressing," incorporated earlier in this specification by reference in its entirety. As previously noted, the connection of these devices in a virtual network ring topology enables the interconnected OPTNet-compatible links that make up the ring to effectively function as a bridged medium. The source and destination addresses in the OPTNet header are not modified each time a packet traverses a device, as would occur if the OPTNet interfaces behaved as IP router interfaces. Therefore, a simple comparison of a destination address field to a value contained in a packet processor register is sufficient to determine if the packet is destined for the device, rather than a tag or label lookup. In addition, there is no need to operate a complex hop-by-hop label distribution protocol (LDP) to set up an end-to-end path through the virtual network. Such a protocol is described in the Internet Engineering Task Force (IETF) Internet Draft "LDP Specification" by L. Andersson et al., draf-ietf-mpls-1dp- 06.txt, incorporated herein by reference in its entirety.

If the virtual network topology is a mesh, then the above method for simple destination address comparisons without an LDP does not work. To route packets through a mesh requires the defined formalism of LDP.

The third step is to compare the source address of the packet to that of the device itself. If the addresses match, then the packet is immediately dropped.

If the packet is destined for the device, then the next step is to perform a tag lookup using the external search machine/memory of the packet processor 48. Based on the tag, different actions will be performed by the configurable processor microcode. (Note that the actual stream ID selected for a given tag will also vary based on the value of the class of service field in the packet.) If the tag corresponds to one used for a transparent crossconnect or Ethernet VLAN port, then the packet processor 48 determines the stream ID for the switch fabric on the switching card. It passes this directly to the switch fabric 50 via a control line. It also determines the egress port ID (for a tributary interface card for synchronous framed data) or the stream ID for the switch fabric on the tributary interface card for packetized data, and attaches these two fields to the front of the packet as shown in FIG. 6. In the event that the tag corresponds to one used for a multicast connection, then one or more of the stream ID values will be a multicast stream ID value. The insertion of the above fields is the only modification to the packet. The packet then travels through the remainder of the switching card to the tributary interface card interface without any additional modification.

Optionally, if the tag corresponds to one used for a transparent Ethernet stack encoding port, then the packet processor 48 performs exactly the same steps as above for the transparent crossconnect.

Optionally, if the tag corresponds to one used for a normal Ethernet stack encoding port, the packet processor 48 performs the same steps as above for the transparent crossconnect. In addition, it may pop (remove) or push (add) an additional label to the MPLS label stack within the Ethernet payload (or do nothing), depending on routing information that it has received via LDP.

Optionally, if the tag corresponds to one used for an IP router port, then the packet processor 48 performs the same steps as above for the transparent crossconnect. In addition, it adds an Ethernet frame encapsulation to the IP packet contained with the OPTNet header. The Ethernet header values are determined based on routing information received from a routing protocol such as the Border Gateway Protocol (BGP) or OSPF. BGP is described in the book "BGP4: Inter-Domain Routing in the Internet" by John W. Stewart III, Addison Wesley Longman, Inc., 1999, incorporated herein by reference in its entirety.

To minimize jitter for high-priority, e.g. EF, traffic as it is added onto a OPTNet-compatible link from a device then passes through multiple devices in the virtual network, it is necessary to prioritize this traffic over other types of traffic. In addition, it is necessary to arbitrate between pass traffic and add traffic at a given device. The MMC 5400 switch supports prioritization of different classes of service using either the well-known mechanisms of strict priority or weighted fair queueing. In addition, a simple approach for dealing with prioritization of pass traffic of a given class and add traffic of a given class is to arbitrate between them within the switching fabric using weighted fair queueing. More complicated approaches require additional hardware and/or microcode functionality in the packet processor 48.

In one embodiment, the above-described hardware processes bits at a rate greater than 1 Gbps.

Figure 12:
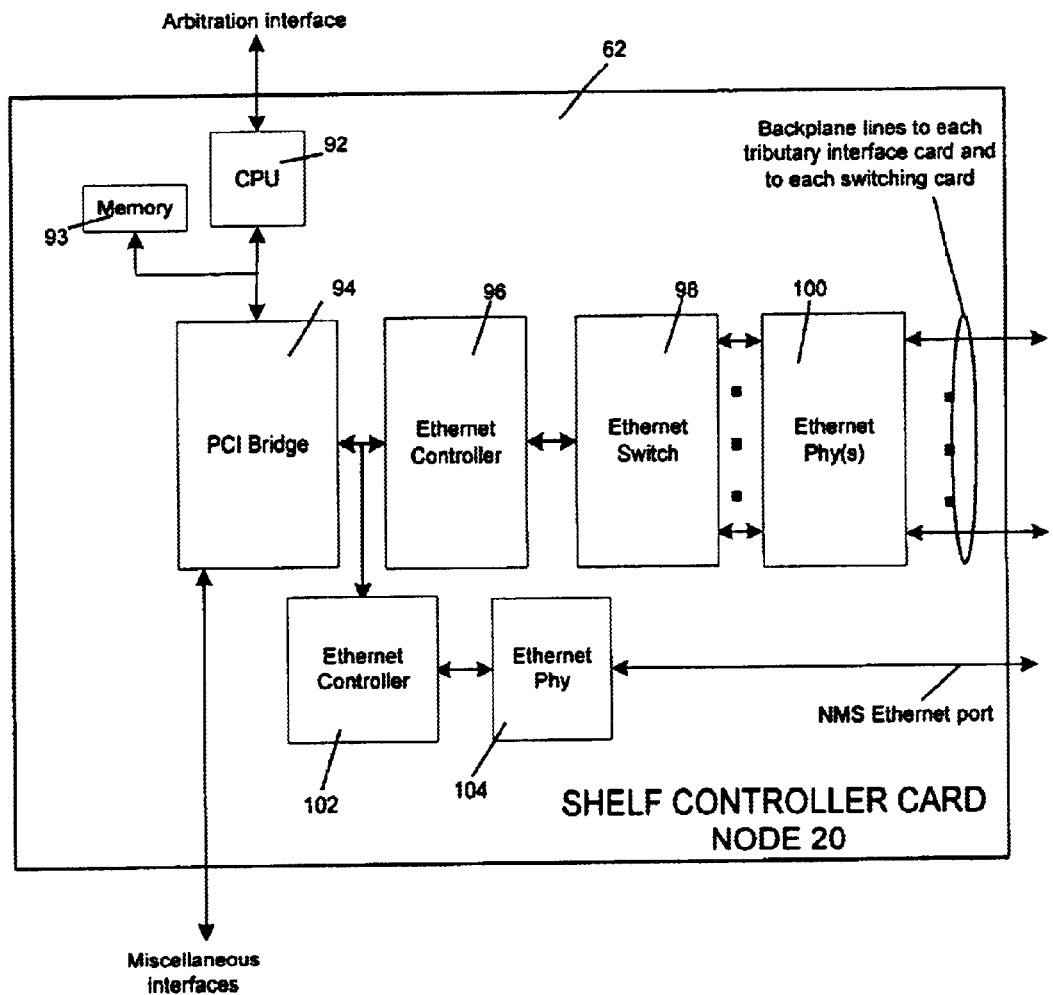
FIG. 12 illustrates additional detail of the shelf controller card shown in FIG. 4.

Mechanisms to Provide Provisioning and Routing Information to Tributary Interface Cards FIG. 12 illustrates one shelf controller card 62 in more detail. The shelf controller 62 both provisions other cards within the device 20 and obtains status information from the other cards. In addition, the shelf controller interfaces with an external network management system and with other types of external management interfaces. The software applications controlling these functions run on the CPU 92. The CPU may be an IBM/Motorola MPC750 microprocessor.

A memory 93 represents memories in the node. It should be understood that there may be distributed SSRAM, SDRAM, flash memory and EEPROM to provide the necessary speed and functional requirements of the system.

The CPU is connected to a PCI bridge 94 between the CPU and various types of external interfaces. The bridge may be an IBM CPC700 or any other suitable type.

Ethernet controllers 96 and 102 are connected to the PCI bus. The controller may be an Intel 21143 or any other suitable type.

An Ethernet switch 98 controls the Layer 2 communication between the shelf controller and other cards within the device. This communication is via control lines on the backplane. The layer 2 protocol used for the internal communication is 100BaseT switched Ethernet. This switch may be a Broadcom BCM5308 Ethernet switch or any other suitable type.

The output of the Ethernet switch must pass through the Ethernet Phy block 100 before going on the backplane. The Ethernet Phy may be a Bel Fuse, Inc., S558 or any other suitable type that interfaces directly with the Ethernet switch used.

The output of the Ethernet controller 102 must pass through an Ethernet Phy 104 before going out the network management system (NMS) 10/100 BaseT Ethernet port. The Ethernet Phy may be an AMD AM79874 or any other suitable type.

Information is delivered between applications running on the shelf controller CPU and applications running on the other cards via well-known mechanisms including remote procedure calls (RPCs) and event-based notification. Reliability is provided via TCP/IP or via UDP/IP with retransmissions.

Provisioning of cards and ports via an external management system is via the NMS Ethernet port. Using a well-known network management protocol such as the Simple Network Management Protocol (SNMP), the NMS can control a device via the placement of an SNMP agent application on the shelf controller CPU. The SNMP agent interfaces with a shelf manager application. The shelf manager application is primarily responsible for the provisioning of cards and ports. It interfaces with a tag generation application to obtain tags that it needs for provisioning lookup tables on the tributary interface cards and switching cards. For provisioned connections such as crossconnects and Ethernet VLANs, the tag generation application generates a tag corresponding to either an output card and port (for a crossconnect) or to a VLAN identifier. This tag can be generated using arbitrary assignment, so long as tags that are in use are not re-used for other connections.

Note that the tag generated for a given crossconnect or VLAN at shelf controller 62 corresponds to the tag used for that crossconnect or VLAN at device 20 only. There must be a mechanism to distribute this tag information to other devices on the virtual network that need to know, e.g. the device(s) at the other end of the crossconnect or VLANs seen by device 20. A simple mechanism is, upon crossconnect or VLAN setup, for shelf manager applications at the relevant nodes to communicate via TCP/IP connections to exchange tags for the specific crossconnect or VLAN IDs that are being set up.

Communication from the shelf controller onto the ring is via the switching card CPU. This type of communication is important both for tag distribution and for sending SNMP messages to remote devices on the virtual network from an external management system physically connected to device 20. Packet payload information is conveyed to the CPU 46 on the switching card (FIG. 11) via the backplane. An application running on CPU 46 encapsulates the payload in a OPTNet header with a tag corresponding to CPU 46 on the destination device (so when the packet is received at the destination device, it is routed by packet processor 48 through the switching fabric to CPU 46). CPU 46 communicates with the packet processor 48 via the CPU port of the switch fabric. This mechanism is described in the documentation for the MMC nP5400 Packet Switch, incorporated earlier in this specification by reference in its entirety. There are separate tag values for separate applications on CPU 46, e.g. based on the tag, CPU 46 knows upon receipt whether to route a certain payload to the shelf controller or to other applications running on CPU 46.

The header attached to the outgoing control packet by CPU 46 is:

Address mode: 0 for 1 byte addressing mode, 1 for 6 byte addressing mode.

Version: 0 for current version.

Header checksum: 8-bit one's complement addition of all 8 bit words in the header (excluding the checksum byte itself).

Destination address: Destination device in virtual network.

Destination address for each destination known on switching card based on topology discovery application described in the co-pending application "Automatic Network Topology Identification by Nodes in the Network," incorporated earlier in this specification by reference in its entirety.

Source address: Source address set on switching card by shelf controller.

Type: Set to 0 for standard tag.

Class of Service: Set to 0 for highest-priority traffic.

Tag: Filled in using a hard-coded value corresponding to the specific type of control communication.

Reserved: The most significant three bits mirror the class of service value set in the above class of service field. The least significant bit is set to zero (not used).

Time to live: Set to 255 (maximum possible value).

Payload frame check sequence: A payload FCS (CRC) is always added at the MAC 44.

The direction that the control packet will take around the ring is determined by the stream ID used to route the packet through the switch fabric 50. There is a separate stream ID corresponding to each OPTNet-compatible fiber-optic interface.

The provisioned information is conveyed to the CPU on the tributary interface cards and on the switching cards via the backplane. The CPU 68 on the tributary interface card for packetized data (FIG. 7) communicates with the packet processor 64, e.g. sets the appropriate registers in memory, via the CPU port of the switch fabric. This mechanism is described in the documentation for the MMC nP5400 Packet Switch, incorporated earlier in this specification by reference. The packet processor then updates its lookup table 65 appropriately. The CPU 46 on the switching card (FIG. 11) communicates with the packet processor 48 using the same mechanism. The CPU 82 on the tributary interface card for framed data (FIG. 8) communicates via a shared bus with the framers 78 and the packetizer/depacketizer 80.

For IP router ports and MPLS ports, the setting of lookup table entries on the tributary interface cards and the switching cards may be the responsibility of the shelf manager or of the routing/label distribution software stacks. Routing stacks for BGP and/or other protocols such as OSPF are well-known and are available from a variety of vendors such as GateD. Tag/label distribution (LDP) stacks are currently under development following the "LDP Specification", incorporated earlier in this specification by reference in its entirety. These routing and label distribution stacks receive routing messages entering the device from interfaces on the tributary interface cards and from interfaces on the virtual network. Based on these routing messages, information about new IP prefixes (address groupings) or MPLS labels used externally to the device are made known to the routing and label distribution stacks. A tag is then generated for each newly received IP prefix or MPLS label.

If the routing message is received from a given port on a tributary interface card for packetized data, then the correspondence of the tag to the IP prefix or to the MPLS label is set in the lookup table of packet processor 64 in FIG. 7. If the routing message is received from a OPTNet-compatible port on the virtual network, then the correspondence of the tag to the IP prefix or to the MPLS label is set in the lookup table of packet processor 48 in FIG. 11. In addition, the tags are distributed across the virtual network using either TCP/IP connections between shelf manager application instances, or via an approach such as that described in the Internet Engineering Task Force (IETF) Internet Draft "Carrying Label Information in BGP-4" by Y. Rekhter et al., draft-ietf-mpls-bgp4-mpls-04.txt, incorporated herein by reference in its entirety The above description of the hardware used to implement one embodiment of the invention is sufficient for one of ordinary skill in the art to fabricate the invention since the general hardware for packet switching and routing is very well known. One skilled in the art could easily program the MACs, packet processors, CPUs, and other functional units to carry out the steps describe herein. Firmware or software may be used to implement the steps described herein.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method performed by a communications network, said network comprising nodes interconnected by communication links, said method comprising:

attachment of a header to an incoming message identifying information required to deliver the message to a destination;

routing of the message through the network to a destination based on information contained in the header, wherein the information comprises an address mode field, the address mode field identifying a type of addressing associated with a source and a destination address fields, wherein a first type of addressing comprises an M-bit address, wherein a second type of addressing comprises an N-bit address, N being significantly less than M.

2. The method of claim 1, wherein the header further comprises the source address field, the destination address field, and the address mode field.

3. The method of claim 2, wherein the header further comprises a version field to indicate a version of the header.

4. The method of claim 1, wherein the network comprises a ring topology, the header further comprising a tag field.

5. The method of claim 1, wherein the header further comprising:

determining whether the incoming message is protected with a cyclic redundancy check (CRC);

adding a payload frame check sequence to the incoming message if the incoming message is not protected with a CRC.

6. The method of claim 1, the header further comprising:

the source address field, the destination address field, and the address mode field;

a version field to indicate a version of the header; and a checksum field.

7. The method of claim 6, further comprising:

determining whether the incoming message is protected with a cyclic redundancy check (CRC);

adding a payload frame check sequence to the incoming message if the incoming message is not protected with a CRC.

8. The method of claim 1, wherein the incoming message comprises synchronous framed data, plesiochronous framed data, synchronous packet-based data, asynchronous packet-based data, asynchronous connection-oriented cell-based data, or frame-based data.

9. A method performed by a communications network, said network comprising nodes interconnected by communication links, said method comprising:

receiving an incoming message at an ingress port;

attaching a header to the incoming message, the header comprising:

a field indicating which of a predetermined set of protection types is associated with the message, and an address mode field identifying a type of addressing associated with a source and a destination address fields, wherein a first type of addressing comprises an M-bit address, wherein a second type of addressing comprises an N-bit address, N being significantly less than M; and routing the incoming message according to the associated protection type.

10. The method of claim 9, wherein the communications network has a ring topology having first and second routing directions and wherein the protection type indicates whether the message is to be routed in the first routing direction or in the first and second routing directions.

11. The method of claim 9, wherein the protection type indicates whether the message will be re-routed in case of a device failure or a break in the network.

12. The method of claim 9, wherein the header further comprises at least one stream ID field to identify a stream associated with the message.

13. The method of claim 9, wherein the header further comprises a field representing an identity of the ingress port.

14. A method performed by a communications network, said network comprising nodes interconnected by communication links, said method comprising:

receiving a payload to be transmitted from a node via an egress port of the node;

attaching a header to the payload, the header comprising:
    a field identifying the egress port through which the payload is to be transmitted, and
    an address mode field identifying a type of addressing associated with a source and a destination address fields, wherein a first type of addressing comprises an M-bit address, wherein a second type of addressing comprises an N-bit address, N being significantly less than M; and transmitting the payload through the egress port identified in the header.

15. The method of claim 14, wherein the header further comprise a field containing a stream identifier associated with the payload.

* * * * *